April 11, 1933. M. R. HUTCHISON, JR 1,903,677
LOGARITHMIC GEARING
Filed April 30, 1929 3 Sheets-Sheet 1

INVENTOR
M. R. Hutchison, Jr.
BY
Philip S. McLean.
ATTORNEY

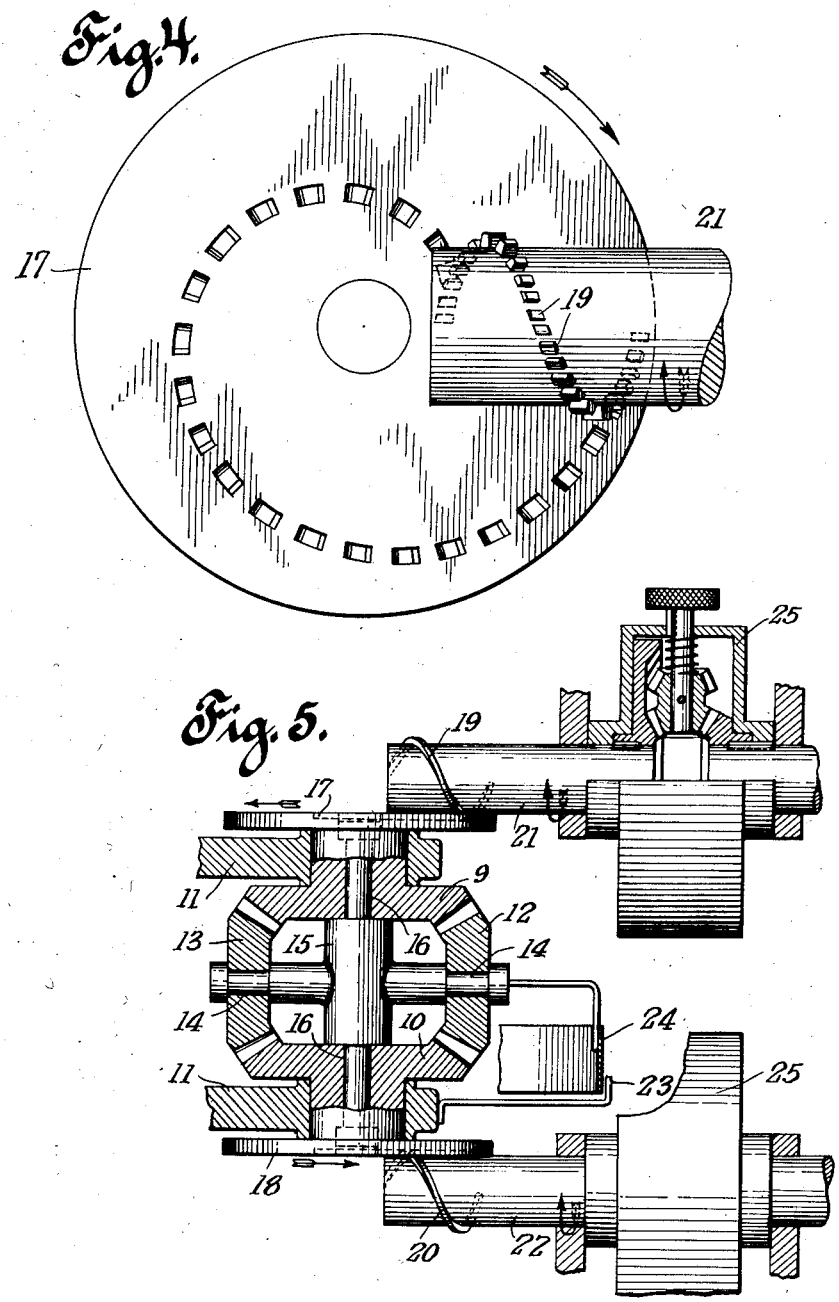

Patented Apr. 11, 1933

1,903,677

UNITED STATES PATENT OFFICE

MILLER R. HUTCHISON, JR., OF EAST ORANGE, NEW JERSEY, ASSIGNOR TO PIONEER INSTRUMENT COMPANY, INCORPORATED, OF BROOKLYN, NEW YORK, A CORPORATION OF NEW YORK

LOGARITHMIC GEARING

Application filed April 30, 1929. Serial No. 359,306.

This invention relates to logarithmic principles and the utilization of those principles for practical purposes.

The objects of the invention are to provide simple mechanical means for directly converting logarithmic relations into useful results and which necessarily will be accurate, positive and unfailing and useful in many different fields.

A practical explanation of the invention as applied to a so-called "average speed indicator" is given in the following specification, but this is primarily by way of disclosure and not intended by way of limitation.

The many novel features of the invention as well as the new combinations and relations of parts, together with the possibilities of the uses of the invention will appear as the specification proceeds.

The drawings accompanying and forming part of this specification illustrate both diagrammatically and in a practical physical embodiment, the principles underlying and embodying the features of the invention, but it will become apparent that the physical structure may be modified as regards the present disclosure without departure from the broad spirit and true scope of the invention.

Figure 1:
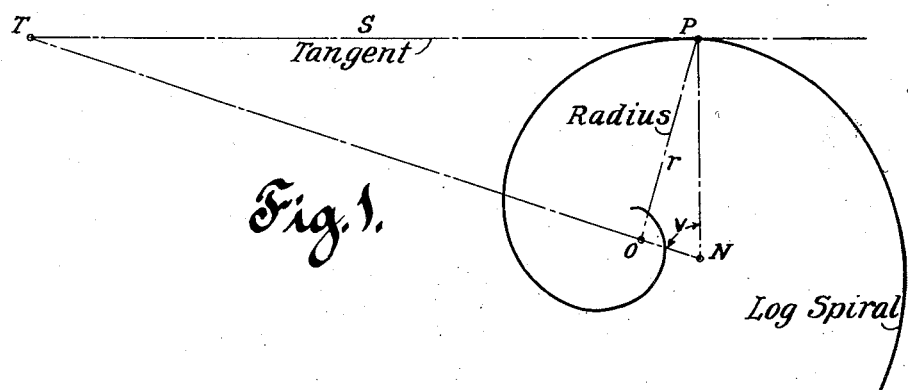
Figure 2:
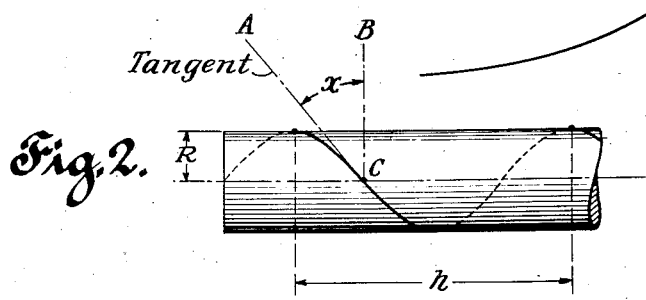
Figure 3:
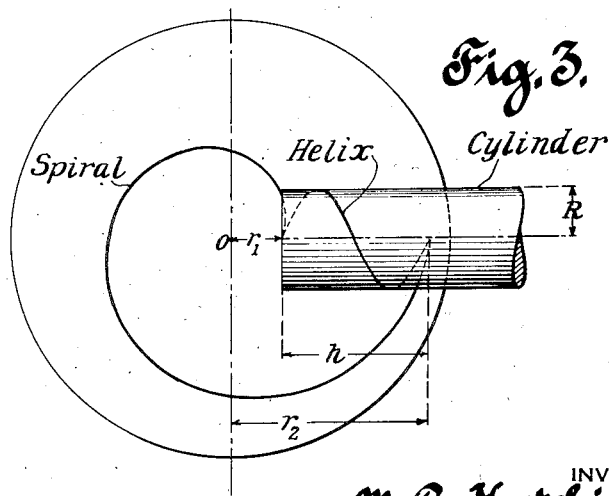
Figure 6:
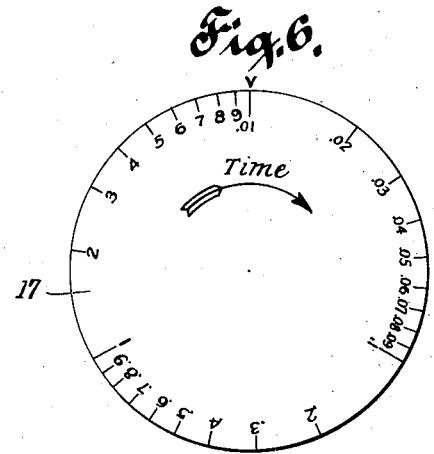
Figure 7:
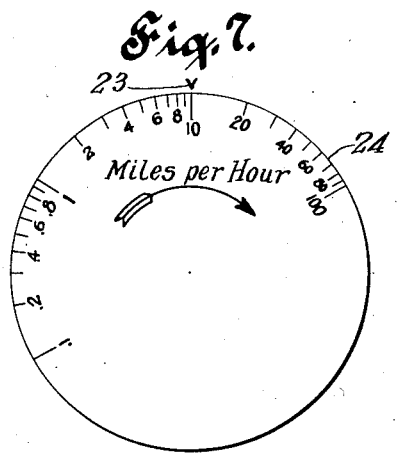
Figure 8:
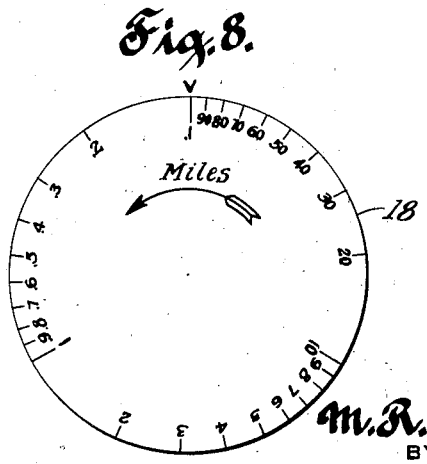

Figs. 1, 2 and 3 are diagrammatic views depicting the development and conversion of the mathematical principles of the invention into mechanical form; Fig. 4 is a broken part sectional plan view and Fig. 5 is a broken sectional view, illustrating a form of the invention as embodied in an instrument for indicating average speed; Figs. 6, 7 and 8 are plan and somewhat diagrammatic views illustrative of the time disc, the indicator pointer and the distance disc respectively.

Considering first the fundamentals on which the invention is based, Fig. 1 indicates a typical logarithmic spiral, the same being shown as a curve, which cuts the radii from the center O at a constant angle $v$ whose cotangent is $m$. The polar equation is $$r = ae^{\text{mrad } \theta}$$
$$a = r \text{ when } \theta \text{ is zero}$$

For large negative values of $\theta$ the spiral winds around O as an asymptotic point.

If PT and PN are the tangent and normal respectively, at P, the line TON being drawn perpendicular to OP, then $$ON = rm \text{ and } PN = r\sqrt{1+m^2} = r/\sin v.$$

The length of arc from O to $P = s = r/\cos = v. = PT$
(The angle $v$ is the angle PNO.)

We turn now from consideration of the logarithmic curve to consideration of the helix. The latter, as illustrated in Fig. 2 is a curve of a screw thread on a cylinder of radius R. This curve crosses the elements of the cylinder at a constant angle. The pitch $h$ is the distance between two coils of the helix as measured along an element of the cylinder. Hence $h = 2\pi r \tan x$.
The length of one coil =

$$\sqrt{(2R)^2 + h^2} = 2\pi r/\cos x.$$

It will be seen that if the cylinder be rolled out on a plane, the development of the helix will be a straight line with a slope equal to tan $x$. (Angle $x$ is the angle ACB.)

Combining the features of the logarithmic curve and helix as above discussed, we may suppose the plane surface as indicated in Fig. 3 pivoted at O and in driven or driving contact with a helix whose axis intersects that of the plane surface, at right angles, from which it will be found that if the helix cylinder is rolled out on the plane about O, the development of the helix will be a logarithmic spiral. The tangent to the helix at any point of contact with the plane coincides with the tangent to the logarithmic spiral at that point for elements of the cylinder and radii from O coincide and both curves cross the elements and radii respectively at constant angles. Thus it will be seen that the angles PNO and ACB are complementary, their sum being 90 degrees.

The effect of the combination described, with the helical member as the driving member, will be to produce angular displacement of the plane surface about O proportional to the logarithm of the angular displacement of the helix about its own axis. This relationship is effective throughout a complete revolution of the helix cylinder and in the event of continued revolution of the cylinder, becomes cyclic. The amount of angular displacement of the plane surface about O per revolution of the cylinder, depends upon the pitch and diameter of the helix, and also upon the plane radius of the initial point of the driving helix.

The relationship may be derived as follows:

The general equation of the log spiral is $$r = ae^{m\theta}$$

where $m$ is the cotangent of the angle between the tangent to the curve and the polar vector passing through the point of tangency. Referring to Fig. 1, the angle is the angle $v$ and the cotangent is $$\frac{TN}{NP}$$

It will now be apparent that for the helix shown in Fig. 2 to coincide with the spiral when the latter is driven by the former, one complete turn of the helix must equal the length of the spiral for one complete turn, and the angle between the tangent AC (Fig. 2) and the axis of the helix will be equal to the angle $v$ of the spiral shown in Fig. 1, since the tangents to the spiral will coincide with the tangents to the helix at the points of contact of the two curves. Therefore, the angle $x$ is a complement of the angle $v$.

In order to get the relation between the spiral and the helix in mathematical terms it is necessary to take the equation for the length of the helix and the equation for the length of the spiral and equate the two, i. e., $$\frac{2\pi R}{\cos x} = \frac{r_2 - r_1}{\cos v}$$

Since the angles $x$ and $v$ are complementary $$\cos x = \sin v$$

and by substitution $$\frac{2\pi R}{\sin v} = \frac{r_2 - r_1}{\cos v}$$

transposing we get $$\frac{\cos v}{\sin v} = \frac{r_2 - r_1}{2\pi R}$$

or $$\cot v = \frac{r_2 - r_1}{2R} = m$$

but $$r_2 - r_1 = h$$

Therefore $$m = \frac{h}{2\pi R}$$

where $h$ equals the pitch of the helix and R equals the radius of the latter. Then taking the general form of the equation of the logarithmic spiral which is $$r = ae^{m\theta}$$

and substituting $$\frac{h}{2\pi R} \text{ for } m$$

we get the equation $$r = ae^{\frac{h\theta}{2\pi R}}$$

this being the equation of the logarithmic spiral all points of which coincide with all points of the helix when the latter drives the former.

When $\theta$ equals $2\pi$ or zero, $a$ equals $r_1$ and the equation for these values becomes $$r = r_1 e^{\frac{h\theta}{R}}$$

For a derivation of the equations of the lengths of the spiral and of the helix reference may be had to any standard mathematical text.

Inasmuch as the tangents to the two curves coincide at the point of contact, the drive between the helix and the plane may be a positive one as in the form of intermeshing teeth elements, but if desired, this may be a form of frictional drive.

The foregoing logarithmic reduction is useful in connection with determining the product or quotient of two numbers, automatically adding or subtracting their logarithms and indicating results upon a suitable scale. The scale or the pointer cooperating therewith may be moved by mechanism embodying the features described in a mechanical form.

Another use of the invention is for the indication of the average of a changing magnitude with respect to another changing quantity whose characteristics are known. An example of the latter is an average speed indicator.

In Figs. 4 and 5, the structure for an average speed indicator is illustrated as consisting of an epicyclic train embodying three principal members, the motion of any one of which depends upon the motions of the other two.

In the illustration, this epicyclic train consists of the master gears 9 and 10 journalled in suitable bearings 11 and meshing with minor gears 12, 13, journalled on the spindles 14 of a suitable carriage 15, which in turn is journalled at 16 on the common axis of the master gears. The master gears carry the discs 17, 18 corresponding to the planes of the diagrams and these are engaged by the helical ribs or driving teeth 19, 20 on shafts 21, 22, corresponding to the helices on the cylinders of the diagrams.

The master gears 9 and 10 are thereby caused to move in accordance with logarithmic reductions from shafts 21 and 22 and the carriage 15 which takes its movement from these gears, through pinions 12, 13, is shown as equipped with a logarithmic scale 23 reading on a stationary index or pointer 24. The graduation of this scale is in accordance with the logarithmic reduction ratios existing between the drive shafts and discs.

In the illustration, it may be assumed that the upper shaft 21 is driven by a clock at a uniform speed of rotation and that the lower shaft 22 is driven from the road wheels of a vehicle so that its angular movement is directly proportional to distance travelled. The master gears are initially indexed, as is also the movable carriage, at unity. This indexing may be effected by suitable clutch mechanism such as that indicated at 25 in Fig. 5.

With the vehicle travelling at either varying or constant speed while the clock runs at constant speed, it will be seen that the position of the indicator will depend upon the relative movements of the two spiral discs and their attached gears. The movements of these gears being opposite, the pointer will show on the scale at any time the average speed for the time elapsed, the same being the quotient of distance/time elapsed up to that moment.

Figs. 6, 7 and 8 show by way of example how the parts may be proportioned, the first of these views illustrating the upper spiral disc which in the illustration is the "time" disc and laid out to cover a period of 10 hours for one revolution, the figures in this view illustrating the logarithmic proportioning for this result. Fig. 8 illustrates the lower or distance spiral disc 18 as laid out logarithmically for a distance of 100 miles. Between these two figures is a schematic representation of the indicator mechanism laid out logarithmically to represent average miles per hour.

The invention it will be seen may be applied to many different purposes and the structure may be modified to suit such purposes, all within the broad scope and intent of the claims. Because of these facts, the terms employed herein should be considered as used in a descriptive rather than in a limiting sense, except for such limitations as may be implied by the state of the prior art.

What is claimed is:

1. A logarithmic gear train, comprising in combination helical and logarithmic spiral gearing elements arranged on curves, whose tangents coincide at the point of contact.

2. A logarithmic gear train, comprising cooperating driving and driven helical and logarithmic spiral gearing elements on curves, whose tangents coincide at the point of contact.

3. Logarithmic gearing, comprising a rotary member having a helical gear element and a cooperating member rotatable on an axis at an angle to the axis of the helical member, said second member having a cooperating logarithmic spiral gear element arranged in a plane and coinciding with the helix of the first member in all positions of relative rotation of the two members.

4. Logarithmic gearing, comprising a pivoted disc carrying a gear element in the form of a logarithmic spiral and a shaft journalled on an axis intersecting the axis of the disc and carrying a helical gear element cooperatively engaging the logarithmic spiral gear element of the disc.

5. Logarithmic gearing, comprising a pivoted disc carrying a gear element in the form of a logarithmic spiral, a shaft journalled on an axis intersecting the axis of the disc and carrying a helical gear element cooperatively engaging the logarithmic spiral gear element of the disc and means in cooperative driven relation with said disc member.

6. Logarithmic transmission, comprising opposed master gears, interposed minor gears on a carriage between the master gears, disc elements carried by the master gears and shafts on axes disposed at right angles to the axis of the master gears and having helices contacting the disc elements of the master gears in the paths of logarithmic spirals.

7. Logarithmic transmission, comprising cooperating members relatively rotatable on axes angularly related to each other, one member having a helical gear element and the other member having a cooperating logarithmic spiral gear element coinciding with the helix of the first member in all positions of relative rotation of the two members.

8. Variable speed gearing, comprising in combination a driving worm member and a driven disc member, said disc member having elements in mesh with the worm member and arranged on an axis intersecting the axis of the worm member.

9. Variable speed gearing, comprising in combination a worm member and a disc member having intermeshing elements and arranged one with its axis intersecting the axis of the other.

10. In combination, a driving member having the form of a helix, and a driven member having the form of a logarithmic spiral on an axis at right angles to and intersecting the axis of the helix and the equation of which is:

$$r = ae^{\frac{h}{2\pi R}\theta}$$

where $r$ = polar vector of the spiral, $a$ = a constant, $e$ = the base of Naperian logarithms, $h$ = the pitch of the helix, $R$ = the radius of the helix, and $\theta$ = the directive angle of the logarithmic spiral.

In testimony whereof I affix my signature.

MILLER R. HUTCHISON, Jr.